(12) United States Patent
Angles et al.

(10) Patent No.: US 6,260,835 B1
(45) Date of Patent: Jul. 17, 2001

(54) VIBRATION DAMPER

(75) Inventors: Manfred Angles, Oerlenbach; Günther Handke, Euerbach; Robert Pradel, Heidenfeld, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/210,026

(22) Filed: Dec. 11, 1998

(30) Foreign Application Priority Data

Dec. 11, 1997 (DE) ............................................... 197 55 046

(51) Int. Cl.⁷ ................................. B60G 13/00; F16F 7/00
(52) U.S. Cl. .............. 267/220; 188/321.11; 280/124.155
(58) Field of Search ................................ 267/220, 33, 35, 267/221; 188/322.12, 321.11; 411/349, 549, 104, 522; 280/124.155, 124.177; 403/348, 349, DIG. 4

(56) References Cited

U.S. PATENT DOCUMENTS

| | | | |
|---|---|---|---|
| 3,180,660 | * | 4/1965 | Brewington .......................... 411/104 |
| 4,391,461 | * | 7/1983 | Deibele ................................. 411/349 |
| 4,612,501 | * | 9/1986 | Costello ............................... 411/349 |
| 4,810,003 | * | 3/1989 | Pinch et al. ......................... 267/220 |
| 4,958,849 | * | 9/1990 | Pinch et al. ................... 280/124.155 |
| 5,222,851 | * | 6/1993 | Dickerson ........................... 411/104 |
| 5,248,134 | * | 9/1993 | Ferguson et al. ..................... 267/220 |
| 5,261,650 | * | 11/1993 | Hein ..................................... 267/220 |
| 5,310,276 | * | 5/1994 | Bergers et al. ....................... 403/349 |
| 5,620,019 | * | 4/1997 | Nicolaisen ............................ 411/549 |
| 5,628,388 | * | 5/1997 | Angermann .......................... 267/220 |

FOREIGN PATENT DOCUMENTS

| | | | |
|---|---|---|---|
| 3228674 A1 | * | 2/1984 | (DE) . |
| 32 28 674 A1 | | 2/1984 | (DE) ................................ F16F/9/54 |
| 33 25 722 C2 | | 1/1985 | (DE) ................................ E05F/3/00 |
| 43 41 436 C1 | | 2/1995 | (DE) ................................ F16F/9/54 |
| 44 40 030 A1 | | 5/1996 | (DE) ............................. B60G/13/00 |
| 195 11 641 C1 | | 7/1998 | (DE) ............................. B60G/15/06 |

* cited by examiner

Primary Examiner—Robert J. Oberleitner
Assistant Examiner—Robert A. Siconolfi
(74) Attorney, Agent, or Firm—Cohen, Pontani, Lieberman & Pavane

(57) ABSTRACT

The invention is directed to a vibration damper such as a shock strut for articulated installation between a car body and a wheel guide part in a motor vehicle by a quick connection. For this purpose, the vibration damper on the shock strut, together with an elastic joint and a connection part, forms a constructional unit or assembly unit. The quick connection is formed between the connection part and the body or the wheel guide without a catch connection and in a rigid manner, so that relative movement is prevented between the connection part and the body or wheel guide part.

13 Claims, 8 Drawing Sheets

VIBRATION DAMPER

BACKGROUND OF THE INVENTION

1. Field of the Invention

The invention is directed to a vibration damper or, more specifically, a shock strut for articulated installation between a car body and a wheel guide part in a motor vehicle. The vibration damper has a piston rod sealably guided in a cylinder. The connections between the vibration damper and the car body and the wheel guide are made using an elastic joint. The elastic joint and the vibration damper form a constructional unit that is connected to the wheel guide part or the car body by a quick connection.

2. Description of the Related Art

To simplify the assembly of shock struts or vibration dampers, it is desirable for the vibration dampers to form together with the elastic joint, an assembly unit that can be installed by an easy assembly step which can preferably be carried out by an assembly robot.

Reference DE 44 40 030 A1 shows a simple assembly of a vibration damper or shock strut of the type mentioned above forming a constructional unit with the elastic joint. A catch connection having radially movable spring tongues is provided between the shock strut and the vehicle. These spring tongues are arranged with a structural component part which is fixed with respect to the vehicle. A connection part connected with the vibration damper engages the spring tongues. An elastic clamping body is required which generates an axial pretensioning at the connection location formed by the spring tongues. A problem with an elastic catch connection of this type is that it tends to generate noise when the clamping body force is exceeded and tends to develop wear due to small relative movements between the spring tongues and their contact surfaces.

SUMMARY OF THE INVENTION

It is the object of the present invention to provide a quick connection which can be assembled without difficulty for connecting a constructional unit comprising vibration damper and elastic joint with the vehicle and which has a simple construction, no noise problems and can be applied for all known elastic bearings.

This object is met according to the invention by a quick connection between the connection part and the body or wheel guide part of a motor vehicle that is constructed without a catch connection and in a rigid manner so that relative movement is prevented between the connection part and the body or wheel guide part also with high supporting forces. A connection of this type is not only very simple to assemble, but there will also be no noise at the connection site because of the rigid connection. Appropriate shaping of the parts for the quick connection prevents disengagement of the quick connections and ensures an absolutely rigid connection between the connection part and the body.

In accordance with a further feature of the invention, the quick connection is constructed as a quarter-turn closure such as a bayonet type closure. The rigid connection is produced between the connection part and the body by a partial revolution of the connection part with respect to the body. When an automated assembly process is used, the vibration damper is already articulately connected with an axle constructional unit of the motor vehicle before assembly of the axle constructional unit with the body. The vibration dampers engage in correspondingly shaped connections of the body when assembled. The rigid fastening of the vibration damper to the vehicle body is effected by a small rotating movement exerted on the connection part by an appropriate tool applied to the connection part which brings about the rigid fastening in the vehicle body. According to the invention, the quick connection having a bayonet type closure is formed either with rivet bolts that are fastened in the connection part and which engage corresponding circumferentially extending receiving slots in a panel or sheet metal of the vehicle body or with rivet bolts that are fastened directly in the panel or sheet metal of the vehicle body and cooperate with receiving slots in the connection part.

In an embodiment form, the rivet bolts are fastened in the connection part, and openings through which the rivet bolts are guided are arranged in the panel or sheet metal of the vehicle body. A fastening ring with receiving slots is supported on the vehicle body and cooperates with the rivet bolts to form the rigid quick connection by a slight rotating movement of the fastening ring. The fastening ring is provided with a device for engaging a tool for carrying out the rotating movement.

In a further embodiment, the quick connection is formed as a bayonet closure and has a connection part provided with radially extending projections which are distributed along the circumference. The projections engage corresponding cut out portions of a receiving part which is fixedly connected with the vehicle body. Another embodiment in which the quick connection formed as a bayonet closure includes a connection element having circumferentially distributed beads which engage corresponding counter-surfaces in the vehicle body or a part which is fixed to the vehicular body. In this embodiment, the counter-surfaces include threads such as those used by threaded connecting elements. For this purpose, the projections or beads of the connection part and/or the counter-surfaces which cooperate with the latter and are fixed to the body are not round but are provided with sloping surfaces.

In a further embodiment, the quick connections which are constructed in a simple manner and connected with the vehicle body without rotating movement are achieved in that the connection part is provided with a snap ring arranged in an annular groove or in that the connection part is provided with an annular bead. The bead or the snap ring engages a corresponding recess which is fixed with respect to the body and is preferably arranged in springing tongues which extend in the axial direction of the vibration damper. After the snap ring or annular bead is engaged with the recess, a ring-shaped or cap-shaped structural component part is pressed on the outer surfaces of the tongues, so that the tongues can no longer spring up and the rigid connection is accordingly produced between the connection part and the body.

Another advantageous embodiment is achieved in that the connection part has a stop disk. The vehicle body or structural component part which is fixedly connected with the vehicle body has tongues extending in the axial direction of the shock strut. The free ends of the tongues are pressed against the stop disk and a cylindrical ring or a cover cap is arranged on the outside of the tongues after the shock strut has been mounted in the vehicle. For this purpose, the stop disk and/or the tongues may include diagonally extending contact faces, and likewise the cylindrical ring or cover cap, so that the tongues are clamped relative to the contact face of the stop disk when the cylindrical ring or the cover cap is pressed on and the rigid connection is formed between the connection part and the body.

A simplification of the embodiment forms is achieved when the connection part is constructed as a spring plate for a supporting spring of the shock strut or as part of a gas spring. This dual function of the connection part reduces costs for manufacture and assembly because fewer structural component parts are required and the spring force of the supporting spring or gas spring brings the piston rod into the fully extended position. The spring force then facilitates the formation of the rigid connection between the connection part and the body.

A safety device is provided to prevent a disengagement of the quick connection. This safety device includes a body which projects into a receiving slot and which preferably comprises a bendable or springing stop or a retaining screw.

Each of the above embodiments of the quick connection according to the invention are applicable for all of the elastic joints commonly used in vibration dampers and shock struts. Only slight changes to the prior art quick connections are required with respect to holding at the connection parts. In quick connections which require a slight rotating movement for assembly, the connection part or the sprint plate formed by the connection part includes a surface which is engagable with a tool so that the tool is used for effecting the slight rotating movement. Further, when the quick connection is arranged in a body dome, it is advantageous to provide an opening in the body dome through which a tool can be inserted for engaging the connection part.

It is advantageous when the elastic joint is arranged under a cover cap which is made from metal or preferably plastic and this cover cap is detachably connected with the vehicle body or with a part fastened to the vehicle body after the vibration damper or shock strut has been mounted. In certain constructions, it may be advantageous for the cover cap to have an insert for noise insulation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings.

In the drawings, wherein like reference characters denote similar elements throughout the several views.

DETAILED DESCRIPTION OF THE PRESENTLY PREFERRED EMBODIMENTS

Figure 1:
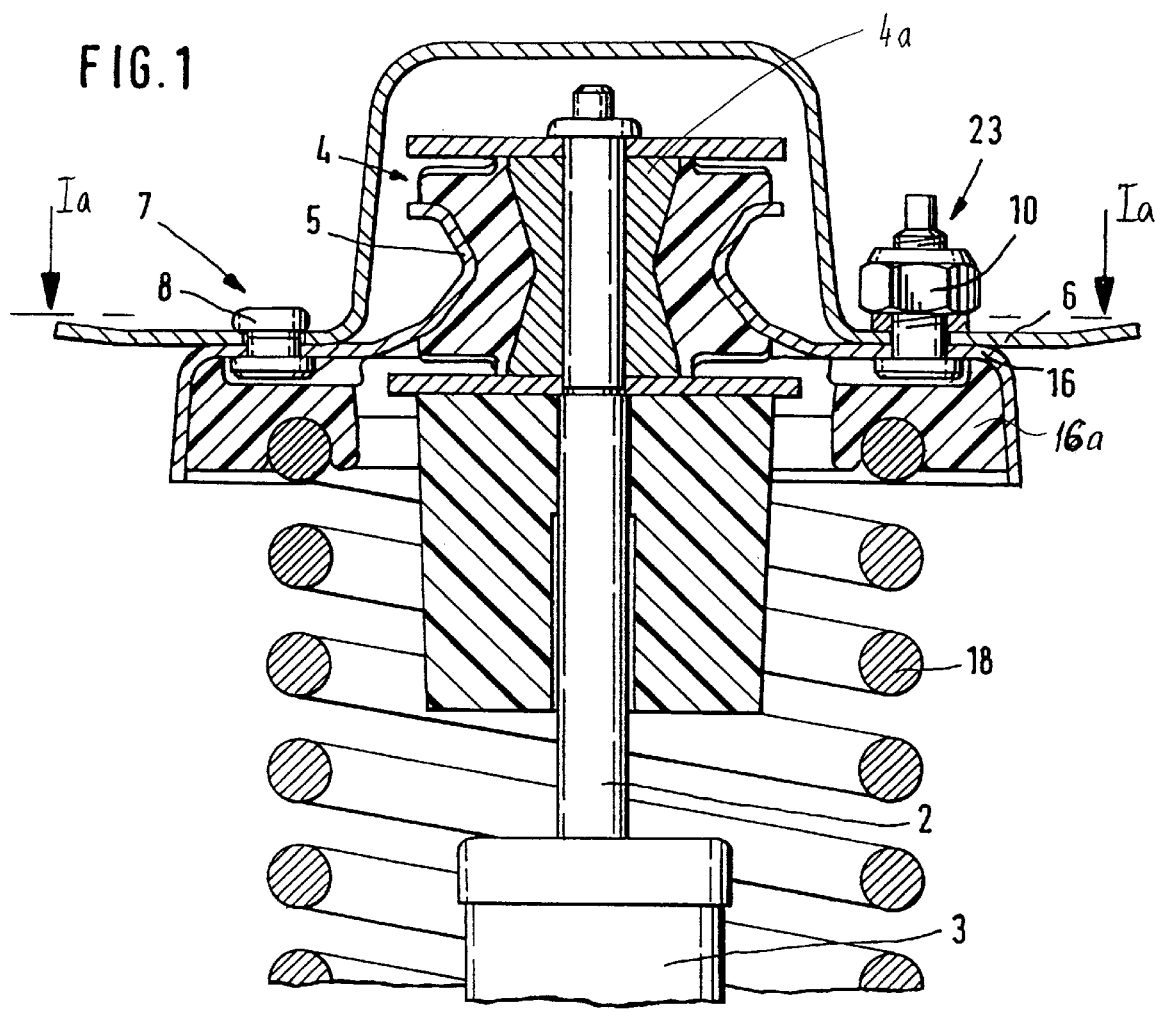
FIG. 1 is a longitudinal sectional view of a quick connection for connecting a vibration damper for a vehicle to a vehicle body according to an embodiment of the present invention.
Figure 1A:
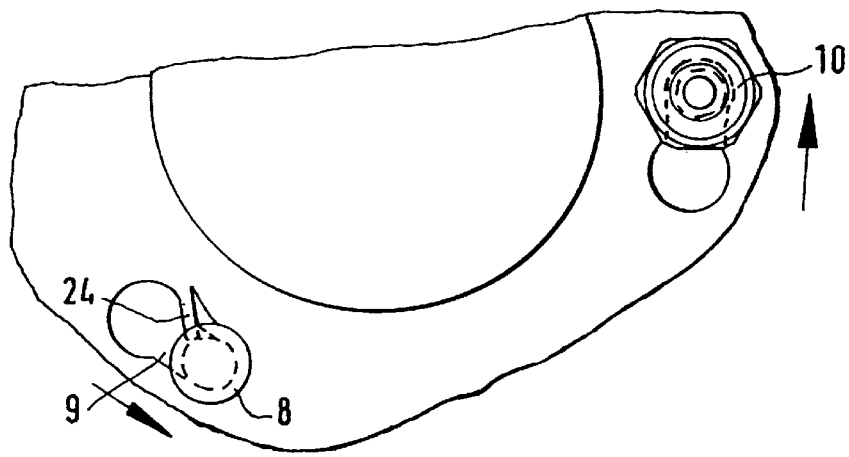
FIG. 1a is a top view of the quick connection of FIG. 1 along line Ia—Ia.

FIG. 1 shows an embodiment of a quick connection 7 for connecting a vibration damper such, for example, as a shock strut 1 with a vehicle body 6 of a motor vehicle. An elastic joint 4 constructed as a pin joint is mounted between a connection part 5 and a piston rod 2 guided in a cylinder 3. The connection part 5 is connected with a joint buffer 4a of the pin joint which is riveted to the piston rod 2. Rivet bolts 8 and connecting part 5 forms a spring plate 16 for receiving a supporting spring 18, including the elastic spring support 16a. As is shown in FIG. 1a, the vehicle body 6 is provided with receiving slots 9. Each of these receiving slots 9 has an opening which is adapted to the head of an associated rivet bolt 8 and a slot which corresponds to the shank of the rivet bolt 8. The slot extends circumferentially about a longitudinal axis of the shock strut 1. The longitudinal axis is preferably a central axis but may also be any longitudinal axis of the shock strut 1. As depicted in FIG. 1, the sheet metal of the vehicle body 6 has a cap-shaped dome in which the elastic joint 4 is accommodated.

The quick connection 7 between the shock strut 1 and the body 6 is effected by introducing the rivet bolts 8 which are fixedly connected with the connection part 5 into the receiving slots 9 and rotating the connecting part 5 using a tool acting on the heads of the rivet bolts 8 which exerts a rotating movement until the shanks of the rivet bolts 8 contact the end of the slots 9 extending in the circumferential direction. This action firmly presses the spring plate 16 axially against the sheet metal of the body 6 and a rigid connection is accordingly provided between the connection part 5 and the body 6. A safety device 23 acting on at least one of the rivets 8 prevents a detachment of the quick connection 7. The safety device 23 may comprise either a retaining screw 10 or a stop 24. The contact faces at the body 6 and/or at the connection part 5 need not be completely flat because, as a result of a slight undulation, the quick connection 7 is constructed with axial pretensioning.

Figure 2:
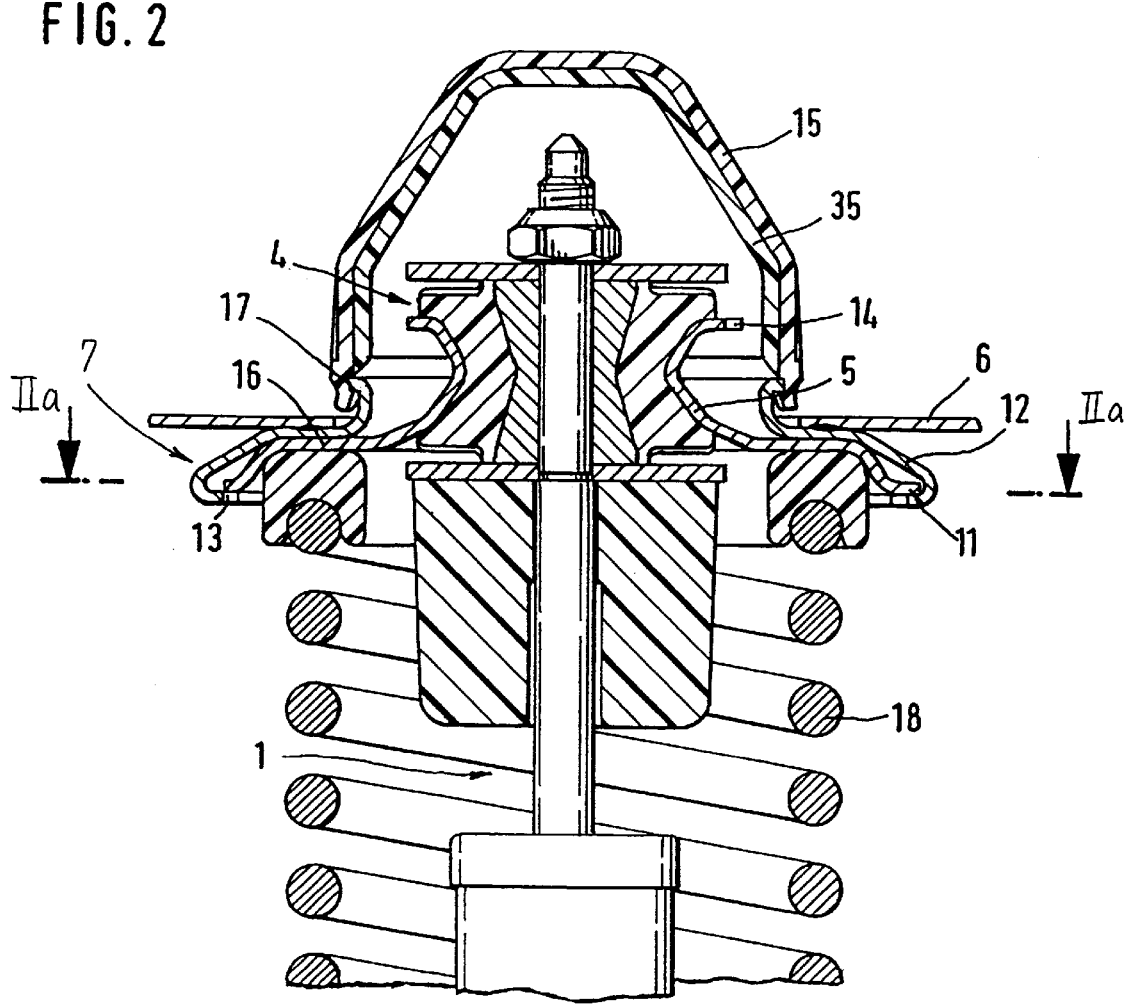
FIG. 2 is a longitudinal section view of another embodiment of a quick connection including a connection part with radially extending projections.
Figure 2A:
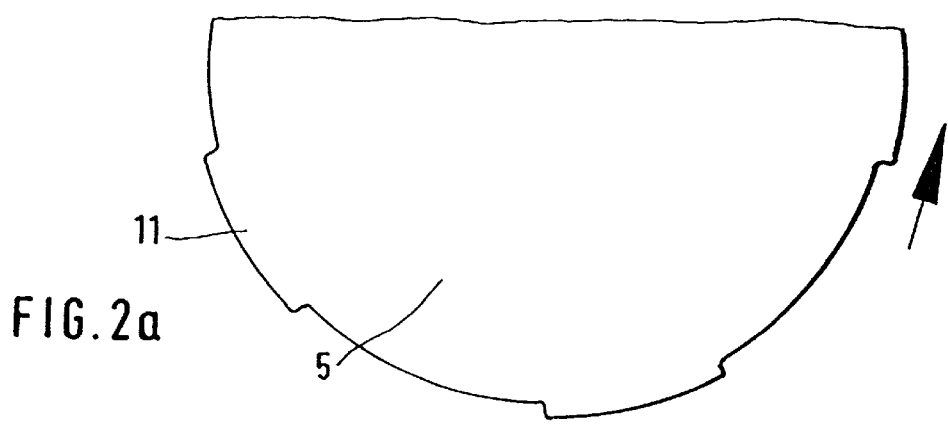
FIG. 2a is a top view showing the radially extending projections of the quick connection in FIG. 2 along line Iia–IIa.

In another embodiment shown in FIGS. 2 and 2a, a receiving part 12 is welded with the sheet metal of the body 6. Before the cover cap 15 is connected to the receiving part 12, the shock strut 1 having a supporting spring 18 is introduced into the receiving part 12 by the connection part 5. The connection part 5 is a spring plate 16 having radially extending projections 11 which engage in corresponding cut out portions 13 in the recess part 12. A tool engages in wrench surfaces 14 of the connection part 5 which rotates the connection part 5 in the receiving part 12. The rotating movement is carried out until the projections 11 are no longer rotatable in the receiving part 12. This quick connection 7 is achieved by means of a corresponding, preferably slightly noncircular shaping of the receiving part 12. After the quick connection 7 has been made, the cover cap 15 closing the elastic joint 4 on the top is connected with the receiving part 12, for example, by means of a catch connection 17. This cover cap 15 is preferably constructed as a plastic part and is provided with an insert 35 for noise insulation.

Figure 3:
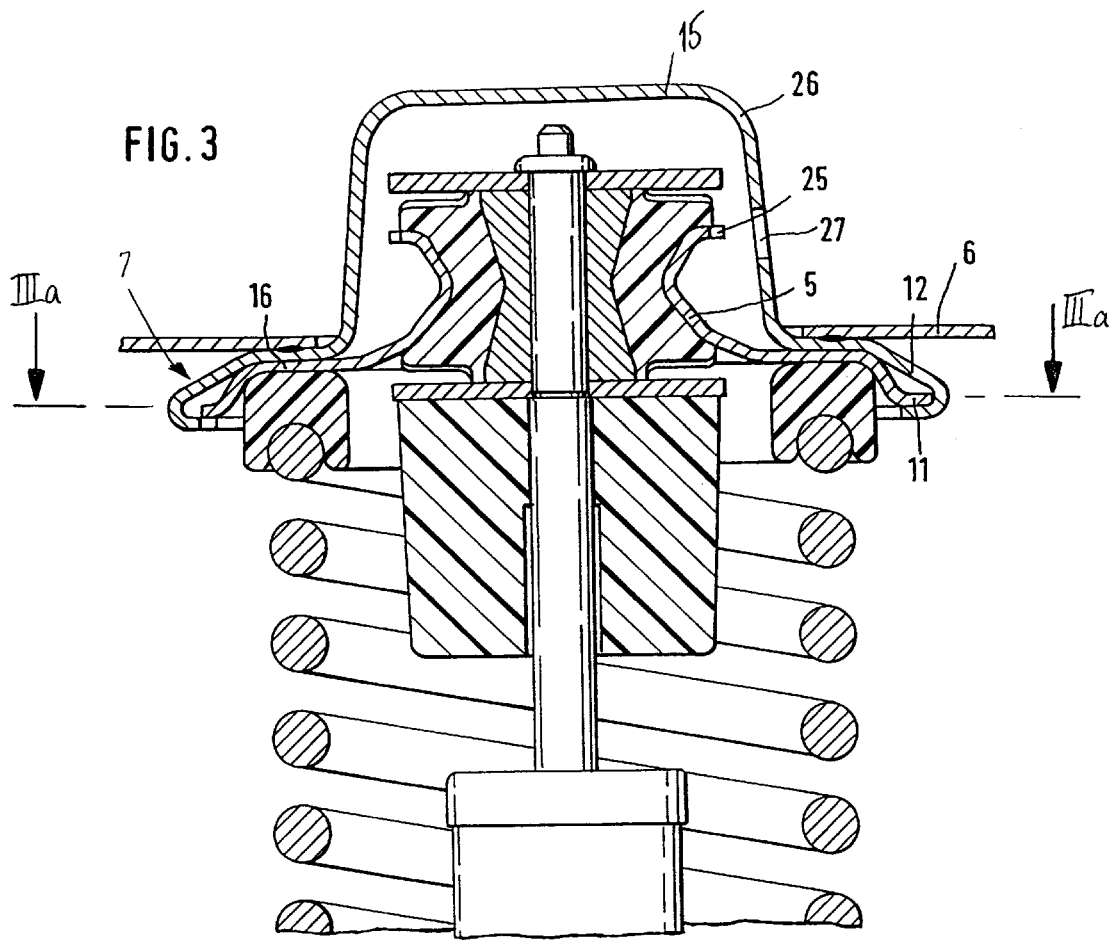
FIG. 3 is longitudinal sectional view of another embodiment of the quick connection in which a receiving part is simultaneously constructed as a cover cap.
Figure 3A:
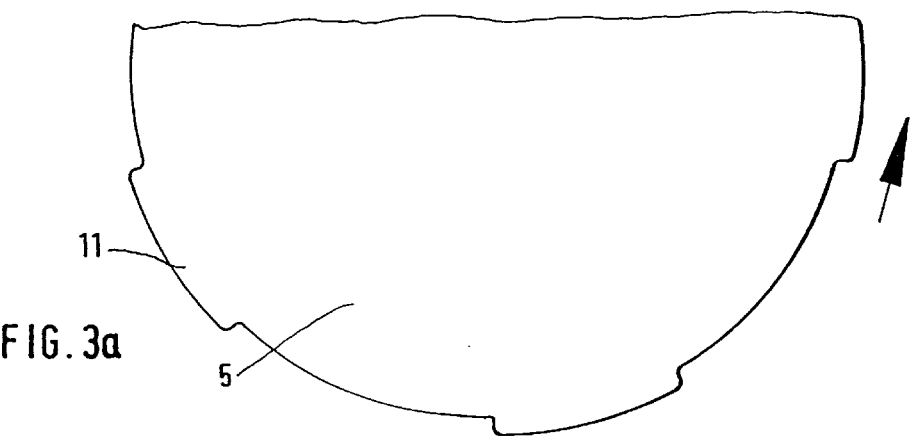
FIG. 3a shows an outline of a spring plate engaging the cover cap of FIG. 3 along line IIIa—IIIa.

In yet another embodiment shown in FIGS. 3 and 3a, the receiving part 12 which is welded with the sheet metal of the body 6 simultaneously incorporates an integrated cover cap 15 as a body dome 26. An opening 27 is provided in the body dome 26 for the rigid connection of the connection part 5 in the receiving part 12. The connection part 5 of this embodiment includes the spring plate 16 and the radially extending projections 11. A tool engaging in a toothing 25 of the connection part 5 may be inserted through this opening 27 and used to rotate the connection part 5 for effecting the rigid connection of connection part 5 with the receiving part 12.

Figure 4:
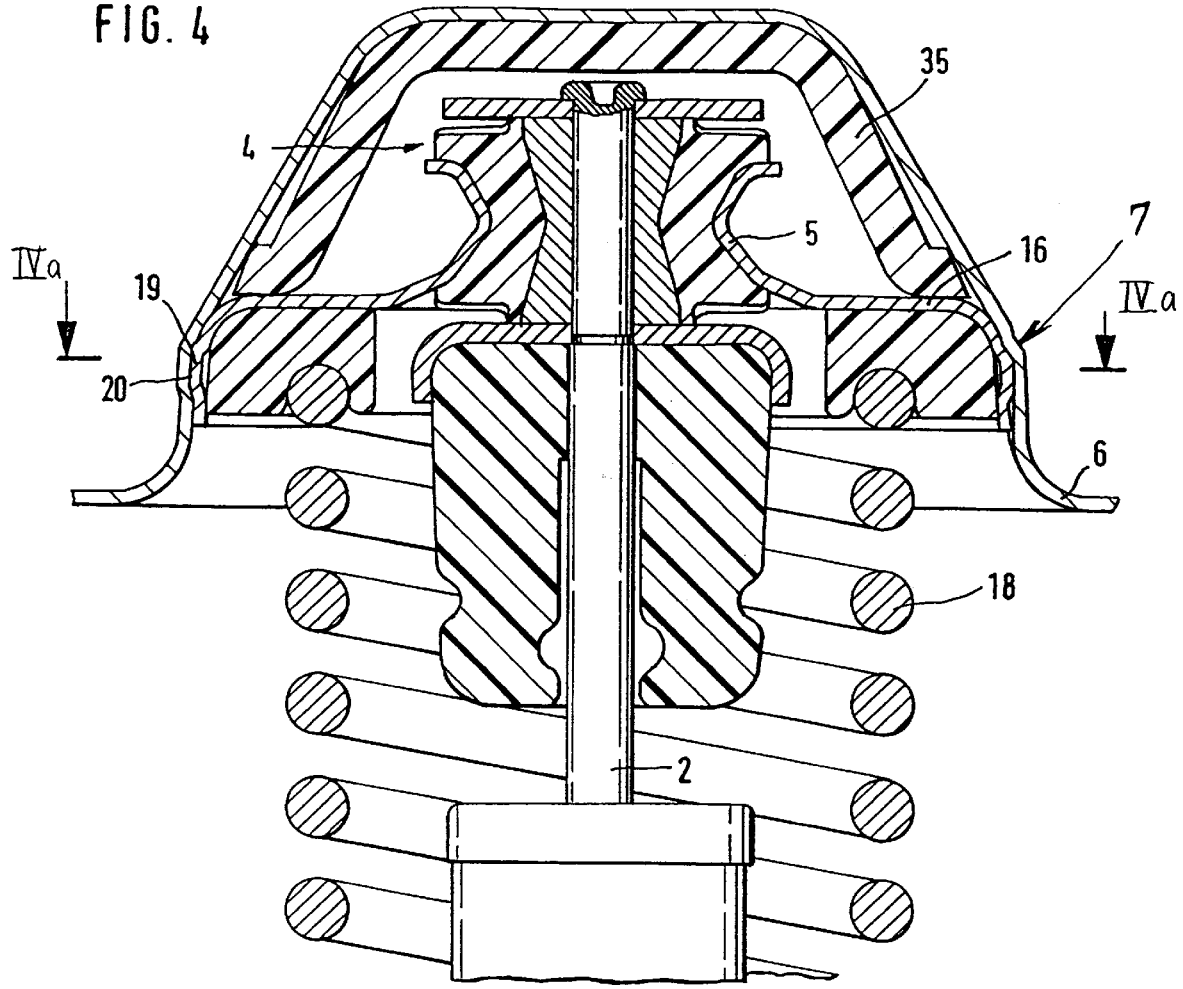
FIG. 4 is longitudinal sectional view of another embodiment of the quick connection with projections of the spring plate which extend radially outward and recesses in a vehicle body sheet metal which extend in a corresponding manner.
Figure 4A:
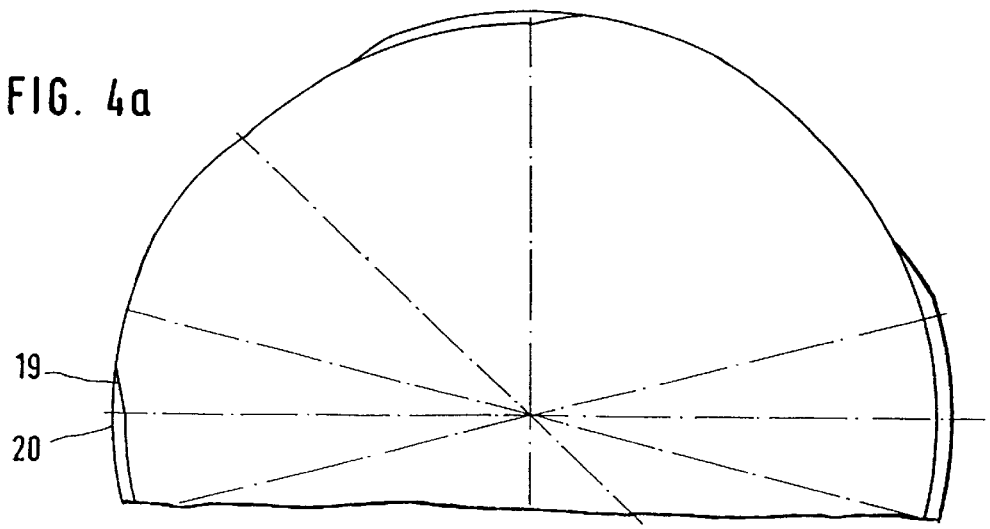
FIG. 4a is a top view of the spring plate shown in FIG. 4 along line IVa—IVa.

A further embodiment is shown by FIGS. 4 and 4a in which the spring plate 16 is constructed integrally with the connection part 5 and includes a plurality of radially projecting beads 19 in its cylindrical outer surface region. The beads extend in the circumferential and radial directions and engage corresponding counter-surfaces 20 which are constructed as recesses and arranged in the sheet metal of the body 6. The quick connection 7 is effected in this embodiment by rotating connection part 5 with the beads 19 with respect to the counter-surfaces 20. It is advantageous when the beads 19 and/or the counter-surfaces 20 are formed so as to be slightly noncircular or eccentric, so that an absolutely rigid connection is provided. The beads 19 and the counter-surfaces 20 may also be constructed in a threaded-like manner for axial pretensioning of the quick connection.

Figure 5:
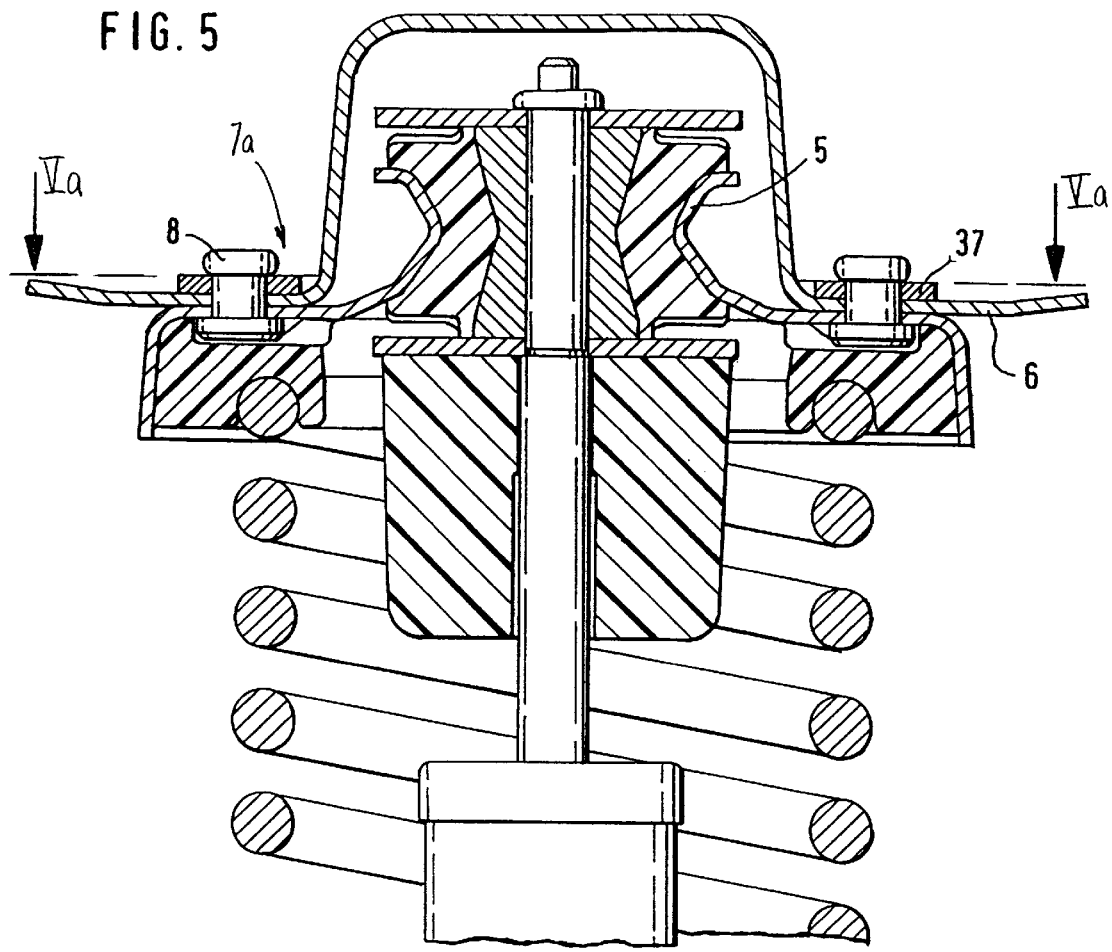
FIG. 5 is longitudinal sectional view of another embodiment of the quick connection with a fastening ring which engages rivet bolts.
Figure 5A:
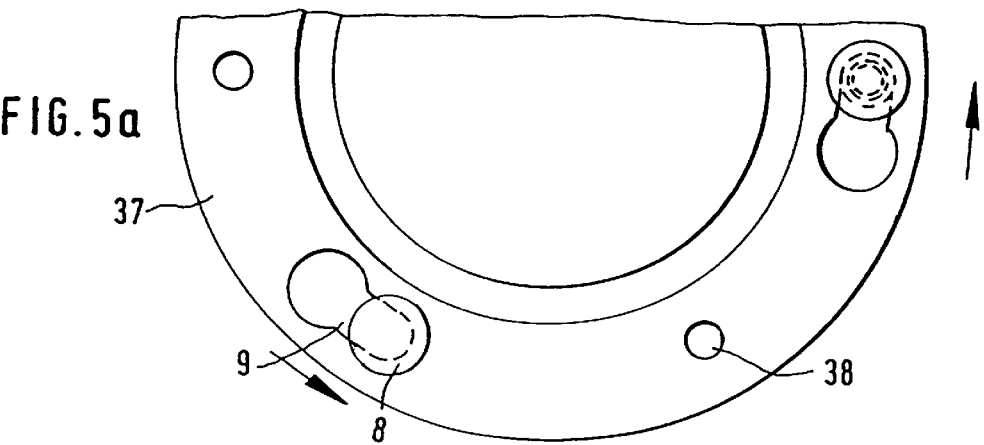
FIG. 5a is a top view of the fastening ring of FIG. 5 along line Va—Va.

The embodiment of the quick connection shown in FIGS. 5 and 5a differs from the embodiment of FIGS. 1 and 1a by the inclusion of a fastening ring 37 incorporating the receiving slots 9. The rivet bolts 8 which are fixedly connected with the connection part 5 are inserted through corresponding openings in the sheet metal of the body 6. The fastening ring 37 is applied subsequently and rotated relative to the rivet bolts 8 by means of a three-hole nut wrench engaging in bore holes 38 until the receiving slots extending in the circumferential direction contact the shank of the rivet bolts 8. A sheet metal screw (not shown) may be inserted into one of the bore holes 38 and screwed into the sheet metal of the body 6 as the safety device 23.

Figure 6:
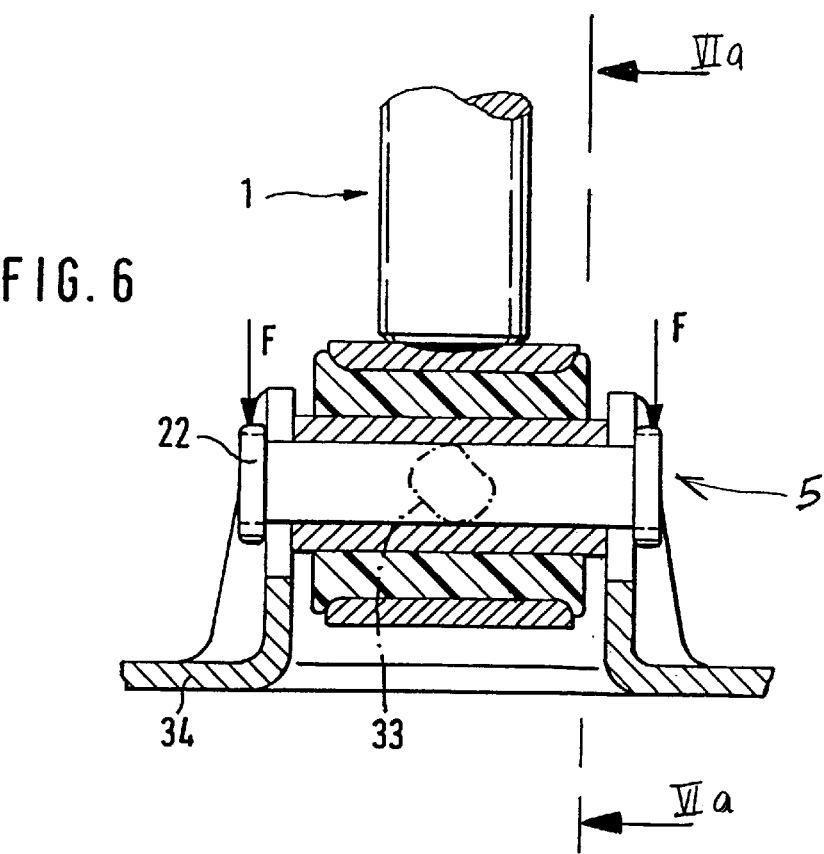
FIG. 6 is longitudinal sectional view of another embodiment of the quick connection formed wherein a rigid connection is caused by a swiveling movement of the vibration damper or shock strut.
Figure 6A:
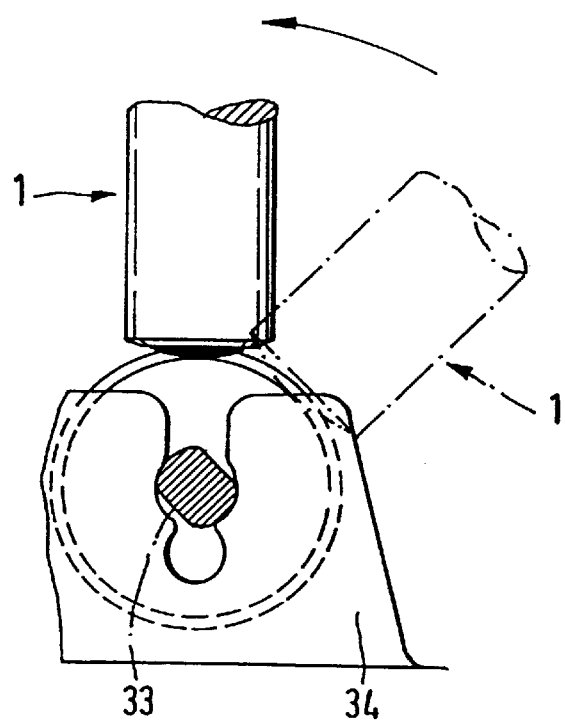
FIG. 6a is sectional view of the rigid connection along line VIa—VIa in FIG. 6.

An embodiment of the quick connection 7 according to FIGS. 6 and 6a has a rivet bolt 22 which forms the connection part and is provided with flattened portions 33. A longitudinal axis of the rivet bolt 22 is perpendicular to the length of the vibration damper. The flattened portions run along a length of the rivet bolt 22 so that the distance between the flattened portions is the thinnest width of the rivet bolt 22. The rivet bolt 22 engages by these flattened portions 33 in a receptacle 34 which is connected with the body 6 or which is preferably formed by an axle carrier plate of a wheel guide part. The receptacle 34 has an insertion slot whose width corresponds to the spacing between the flattened portions 33, wherein the flattened portions of the rivet bolt 22 can only be introduced into the insertion slot in a position which is inclined relative to the installed position of the shock strut 1. After insertion, a swiveling of the shock strut 1 into its installed position is sufficient to produce the quick connection, i.e., the thin width between the flattened portions 33 is no longer aligned with the insertion slot. A construction of this type is especially suitable when the axle is already provided with the shock legs during assembly of the vehicle and this constructional unit is then connected with the vehicle body.

Figure 7:
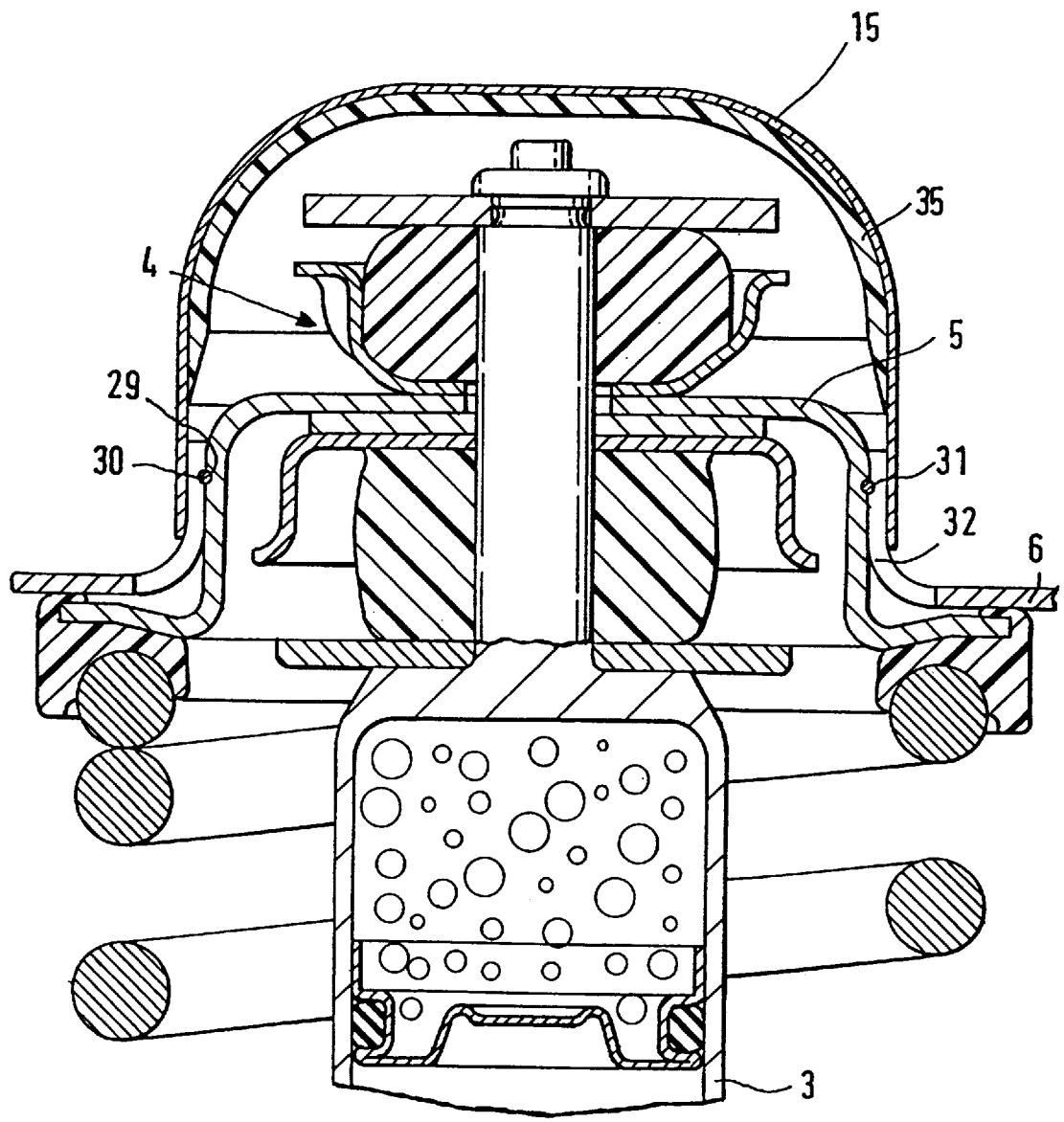
FIG. 7 is longitudinal sectional view of another embodiment of the quick connection with a snap ring in a groove of the connection part and the tongues connected with the body.

FIG. 7 shows another embodiment of a quick connection between the connection part 5 of the elastic joint 4 and the sheet metal of the body 6. For this embodiment, tongues 32 are provided on the body 6 which are bent upward and provided with recesses 31. The outer circumference of the cylindrical section of the connection part 5 has an annular groove 29. A snap ring 30 is inserted in the annular groove 29. The elastic joint 4 of this embodiment is constructed as a pin joint which is fastened to the base of the cylinder 5. During assembly, the cylindrical portion of the connection part 5 engages in the elastic opening formed by the tongues 32 until the snap ring 30 engages in the recesses 31 of the tongues 32. Subsequently, a cover cap 15 comprising a material such, for example, as metal, is pressed onto the outside of the tongues 32, so that a radially and axially fixed connection of the connection part with the body 6 is achieved.

Figure 8:
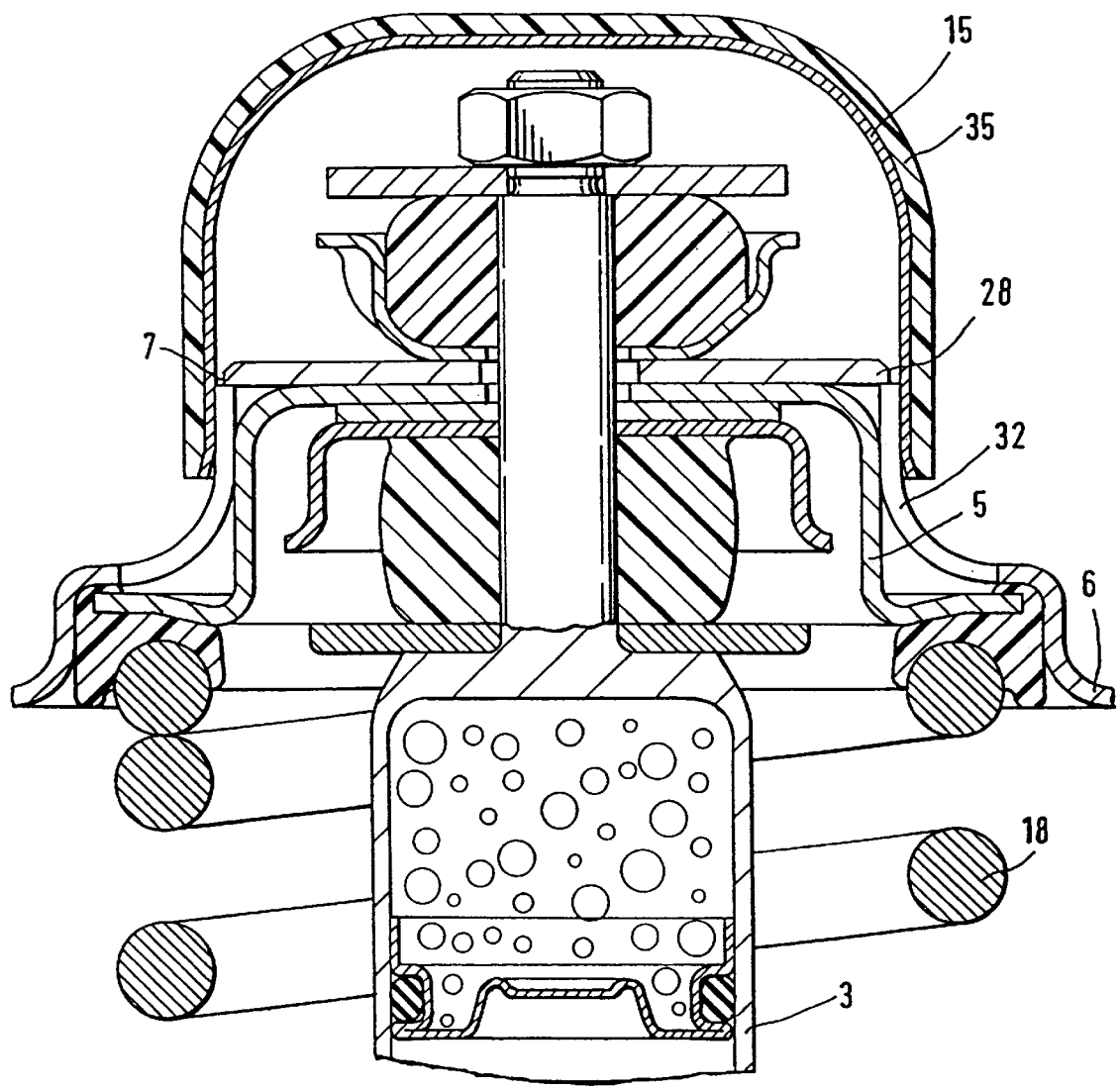
FIG. 8 is longitudinal sectional view of yet another embodiment of the quick connection, wherein the tongues which are fixed to the body cooperate with a stop disk which is connected with the connection part.

The embodiment of the quick connection 7 according to FIG. 8 includes a stop disk 28 which has a somewhat larger diameter than the cylindrical part of the connection part 5. The sheet metal of the body 6 forms a cylindrical receptacle for the supporting spring 18 and its elastic spring support and is provided with tongues 32 which press against the contact face of the contact disk 28 after installation and form the quick connection 7. To achieve extensive axial pretensioning, the contact face of the stop disk 28 and/or the ends of the tongues 32 may include sloping surfaces which prevent a radial springing back when the cover cap 15 is pressed on the outer surface of the tongues 32. The cover cap 15 may comprise a metal such, for example, as steel. An optional insulating cap 35 formed of insulating material is applied to the cover cap 15 in this embodiment for noise insulation.

The invention is not limited by the embodiments described above which are presented as examples only but can be modified in various ways within the scope of protection defined by the appended patent claims.

We claim:

1. A vibration damper for articulated installation between a wheel guide part and a body of a motor vehicle, comprising:
   a cylinder;
   a piston rod sealably guidably inserted in said cylinder;
   a spring arranged between said cylinder and said piston rod such that said piston rod is movable in said cylinder against an urgency of said spring;
   an elastic joint connected to one of said cylinder and said piston rod;
   a connection part having radially extending and circumferentially distributed projections connected to said elastic joint, wherein said cylinder, said piston rod, said elastic joint and said connection part comprise a constructional unit, and wherein said connection part is a spring plate for supporting an end of said spring; and
   a quick connect assembly connectable between the connection part and one of the wheel guide part and the body of the motor so that a rigid connection of said connection part to the one of the wheel guide part and the body of the motor vehicle is producible in response to one of a rotation and a pivoting of said connection part relative to the one of the wheel part and the body, wherein said quick connect assembly comprises a bayonet type closure device in which said radially extending and circumferentially distributed projections are rotatably engagable.

2. The vibration damper of claim 1, wherein a rigid connection is producible between said connection part and said the one of the wheel guide part and the body of the motor vehicle by a partial revolution of said connection part.

3. The vibration damper of claim 1, wherein said bayonet closure device comprises a receiving part fixedly connectable with the one of the body and the wheel guide assembly and said radially extending and circumferentially distributed projections rotatably engage corresponding cut out portions of said receiving part.

4. The vibration damper of claim 1, wherein said quick connect assembly comprises a bayonet type closure device, having said radially extending and circumferentially distributed projections comprise radially projecting said circumferentially distributed beads mounted on said connection part which are rotatably engagable in countersurfaces in the one of the wheel guide device and the body.

5. The vibration damper of claim 4, further comprising a part connectable to the one of the wheel guide device and the body, wherein said countersurfaces are on said part.

6. The vibration damper of claim 1, further comprising a stop disk receivable by a plurality of axially extending tongues of the car body, said vibration damper further comprising a cover cap connectable for holding said stop disk in the plural extending tongues.

7. The vibration damper of claim 1, further comprising a safety device operatively connected for preventing the disengagement of said quick connect assembly.

8. The vibration damper of claim 7, wherein said safety device comprises one of a bendable stop, a spring stop and a retaining screw projecting into said receiving slot.

9. The vibration damper of claim 1, wherein said elastic joint comprises one of a pin joint and an articulated lug.

10. The vibration damper of claim 1, wherein said connection part comprises a surface for receiving engagement of a tool to actuate said quick connect assembly.

11. The vibration damper of claim 1, further comprising a cap mounted over said connection part and wherein said connection part comprises a toothing arranged within said cap for receiving engagement of a tool to actuate said quick connect assembly, said tool being insertable through an opening in said cap.

12. The vibration damper of claim 1, further comprising a cover cap arranged at one end of said vibration damper, wherein said elastic joint is arranged under said cover cap and said cover cap is connectable with the body or a receiving part fixedly connected on said body via actuation of said quick connect assembly.

13. The vibration damper claim 1, further comprising a cover cap covering said connection part and having an insert for noise insulation.

* * * * *